USO12093654B2

(12) United States Patent
Bahrami et al.

(10) Patent No.: US 12,093,654 B2
(45) Date of Patent: Sep. 17, 2024

(54) CODE ENRICHMENT THROUGH METADATA FOR CODE SYNTHESIS

(71) Applicant: FUJITSU LIMITED, Kawasaki (JP)

(72) Inventors: Mehdi Bahrami, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 17/814,516

(22) Filed: Jul. 24, 2022

(65) Prior Publication Data
US 2023/0107242 A1    Apr. 6, 2023

Related U.S. Application Data

(60) Provisional application No. 63/261,602, filed on Sep. 24, 2021.

(51) Int. Cl.
*G06F 40/30* (2020.01)
*G06F 8/30* (2018.01)
(Continued)

(52) U.S. Cl.
CPC ............. *G06F 40/30* (2020.01); *G06F 8/30* (2013.01); *G06F 8/36* (2013.01); *G06F 8/42* (2013.01); *G06F 8/436* (2013.01); *G06F 8/65* (2013.01); *G06F 8/73* (2013.01); *G06F 11/3624* (2013.01); *G06F 16/951* (2019.01); *G06F 18/22* (2023.01); *G06F 18/23213* (2023.01);
(Continued)

(58) Field of Classification Search
CPC ........... G06F 40/30; G06F 16/951; G06F 8/73

USPC .................................................. 717/120–178
See application file for complete search history.

(56) References Cited

U.S. PATENT DOCUMENTS 11,144,725 B2 * 10/2021 Luo ..................... G06N 3/084
11,327,722 B1 * 5/2022 Bahrami ............... G06F 8/311
(Continued)

OTHER PUBLICATIONS

Tuarob, Suppawong, Line C. Pouchard, and C. Lee Giles. "Automatic tag recommendation for metadata annotation using probabilistic topic modeling." Proceedings of the 13th ACM/IEEE-CS joint conference on Digital libraries. 2013.pp. 239-248. (Year: 2013).*
(Continued)

*Primary Examiner* — Satish Rampuria
(74) *Attorney, Agent, or Firm* — Fujitsu Intellectual Property Center; Tiep H. Nguyen

(57) ABSTRACT

According to an aspect of an embodiment, operations for code enrichment through metadata for code synthesis are provided. The operations include acquiring package data that include source code files and package metadata. The operations further include extracting additional metadata associated with software package and preparing metadata features based on the package metadata and the additional metadata. The operations further include identifying a set of target portions of a source code included in the source code files and updating one or more source code files using the metadata features. Such files are updated by performing at least one of a revision of existing code comments, and an addition of new code comments for the target portions. The operations further include generating a dataset of natural language (NL) text features and respective code features and training a language model on a sequence-to-sequence generation task.

19 Claims, 8 Drawing Sheets

(51) Int. Cl.
| | |
|---|---|
| G06F 8/36 | (2018.01) |
| G06F 8/41 | (2018.01) |
| G06F 8/65 | (2018.01) |
| G06F 8/73 | (2018.01) |
| G06F 11/36 | (2006.01) |
| G06F 16/951 | (2019.01) |
| G06F 18/20 | (2023.01) |
| G06F 18/22 | (2023.01) |
| G06F 18/23213 | (2023.01) |
| G06F 40/166 | (2020.01) |
| G06F 40/211 | (2020.01) |
| G06F 40/216 | (2020.01) |
| G06F 40/242 | (2020.01) |
| G06F 40/40 | (2020.01) |
| G06F 40/44 | (2020.01) |
| G06N 3/04 | (2023.01) |
| G06N 3/08 | (2023.01) |

(52) U.S. Cl.
CPC .......... *G06F 18/285* (2023.01); *G06F 40/166* (2020.01); *G06F 40/211* (2020.01); *G06F 40/216* (2020.01); *G06F 40/242* (2020.01); *G06F 40/40* (2020.01); *G06F 40/44* (2020.01); *G06N 3/04* (2013.01); *G06N 3/08* (2013.01)

(56) References Cited

U.S. PATENT DOCUMENTS

| | | | |
|---|---|---|---|
| 11,545,134 B1* | 1/2023 | Federico | G10L 13/033 |
| 2017/0214701 A1 | 7/2017 | Hasan | |
| 2018/0024911 A1 | 1/2018 | Kruszewski et al. | |
| 2020/0349468 A1* | 11/2020 | Arya | G06F 18/214 |
| 2021/0191696 A1 | 6/2021 | Ibarra Von Borstel et al. | |
| 2022/0198294 A1* | 6/2022 | Schneuwly | G06F 16/24564 |
| 2022/0215167 A1* | 7/2022 | Rajpathak | G06F 40/30 |

OTHER PUBLICATIONS

Bernasconi, Anna, et al. "META-Base: a novel architecture for large-scale genomic metadata integration." IEEE/ACM Transactions on Computational Biology and Bioinformatics 19.1 (2020): pp. 543-557. (Year: 2020).*

Jones, Matthew B., et al. "Managing scientific metadata." IEEE Internet Computing 5.5 (2001): pp. 59-68. (Year: 2001).*

Yan, Cong, and Yeye He. "Synthesizing type-detection logic for rich semantic data types using open-source code." Proceedings of the 2018 International Conference on Management of Data. 2018.pp. 35-50. (Year: 2018).*

McKay, Cory, and Ichiro Fujinaga. "Improving automatic music classification performance by extracting features from different types of data." Proceedings of the international conference on Multimedia information retrieval. 2010. pp. 257-266 (Year: 2010).*

Schober, Daniel, et al. "nmrML: a community supported open data standard for the description, storage, and exchange of NMR data." Analytical chemistry 90.1 (2018): pp. 649-656. (Year: 2018).*

Albrecht, Felipe, et al. "DeepBlue epigenomic data server: programmatic data retrieval and analysis of epigenome region sets." Nucleic acids research 44.W1 (2016): pp. W581-W586. (Year: 2016).*

Feng, Zhangyin, et al. "Codebert: A pre-trained model for programming and natural languages." arXiv preprint arXiv:2002.08155 (2020).

"CodeXGLUE" retrieved from the Internet: <URL:https://github.com/microsoft/CodeXGLUE>.

Yin, Pengcheng, and Graham Neubig. "TRANX: A transition-based neural abstract syntax parser for semantic parsing and code generation." arXiv preprint arXiv: 1810.02720 (2018).

Yin, Pengcheng, et al. "Learning to mine aligned code and natural language pairs from stack overflow." Proceedings of the 15th International Conference on Mining Software Repositories. 2018. arXiv:1805.08949v1 [cs.CL] May 23, 2018.

Oda, Yusuke, et al. "Learning to generate pseudo-code from source code using statistical machine translation." 2015 30th IEEE/ACM International Conference on Automated Software Engineering (ASE). IEEE, 2015.

Yin, Pengcheng, and Graham Neubig. "A syntactic neural model for general-purpose code generation." arXiv preprint arXiv:1704.01696 (2017).

CodeXGLUE—Text2Code Generation, retrieved from the Internet: <URL: https://github.com/microsoft/CodeXGLUE/tree/main/Text-Code/text-to-code>.

Fudaba, Hiroyuki, et al. "Pseudogen: A tool to automatically generate pseudo-code from source code." 2015 30th IEEE/ACM International Conference on Automated Software Engineering (ASE). IEEE, 2015.

U.S. Office Action mailed Jan. 19, 2024 for copending U.S. Appl. No. 17/814,518, 9 pages.

* cited by examiner

Electronic User Interface 300A

ABC
ABC: powerful Python data analysis toolkit
What is it?

ABC is a Python package that provides fast, flexible, and expressive data structures designed to make working with "relational" or "labeled" data both easy and intuitive. It aims to be the fundamental high-level building block for doing practical, real world data analysis in Python. Additionally, it has the broader goal of becoming the most powerful and flexible open source data analysis / manipulation tool available in any language. It is already well on its way towards this goal.

Main Features

Here are just a few of the things that ABC does well:
- Easy handling of missing data
- Size mutability......

Source Code:
- __init__.py
- setup.py
- versioneer.py
- PKG-INFO
- config
- ...

— 306

- Description
- Release History
- Download Files

Classifiers

Development Status
- 5 – Production/Stable

Environment
- Console

Intended Audience
- Science/Research

License
- OSI Approved

Operating System
- OS Independent

Topic
- Science/Research

Programming Language
- Python 308
302

*FIG. 3A*

Electronic User Interface 300B

ABC>ABC>PKG-INFO

Metadata-Version: 2.1
Name: ABC
Version: 1.0.0
Summary: Powerful data structures for data analysis, time series, and statistics
Home-page: https://ABC.pydata.org
Author: The ABC Development Team
Author-email: abc-dev@python.org
License: BSD-3-Clause
Project-URL: Bug Tracker, https://github.com/abc-dev/abc/issues
Project-URL: Documentation, https://abc.pydata.org/abc-docs/stable
Project-URL: Source Code, https://github.com/abc-dev/abc
Platform: any
Classifier: Development Status :: 5 - Production/Stable
Classifier: Environment :: Console
Classifier: Intended Audience :: Science/Research
Classifier: License :: OSI Approved :: BSD License
Classifier: Operating System :: OS Independent
Classifier: Programming Language :: Python
Classifier: Topic :: Scientific/Engineering
Requires-Python: >=3.8
Description-Content-Type: text/markdown
Provides-Extra: test
License-File: LICENSE

*FIG. 3B*

```
"""ABC is a Python package that provides fast, flexible, and
expressive data structures....."""
def combine_hash_arrays(arrays: Iterator[np.ndarray],
num_items: int) -> np.ndarray:
    """
    Parameters
    ----------
    arrays : Iterator[np.ndarray]
    num_items : int
    Returns
    -------
    np.ndarray[uint64]
    Should be the same as CPython's tupleobject.c
    """
    try:
        first = next(arrays)
    except StopIteration:
        return np.array([], dtype=np.uint64)
    arrays = itertools.chain([first], arrays)
    mult = np.uint64(1000003)
    out = np.zeros_like(first) + np.uint64(0x345678)
    for i, a in enumerate(arrays):
        inverse_i = num_items - i
        out ^= a
        out *= mult
        mult += np.uint64(82520 + inverse_i + inverse_i)
    assert i + 1 == num_items, "Fed in wrong num_items"
    out += np.uint64(97531)
    return out
```

— 608

— 606

— 604

— 604A

System 602

600

```
def combine_hash_arrays(arrays: Iterator[np.ndarray],
num_items: int) -> np.ndarray:
    """
    Parameters
    ----------
    arrays : Iterator[np.ndarray]
    num_items : int
    Returns
    -------
    np.ndarray[uint64]
    Should be the same as CPython's tupleobject.c
    """
    try:
        first = next(arrays)
    except StopIteration:
        return np.array([], dtype=np.uint64)
    arrays = itertools.chain([first], arrays)
    mult = np.uint64(1000003)
    out = np.zeros_like(first) + np.uint64(0x345678)
    for i, a in enumerate(arrays):
        inverse_i = num_items - i
        out ^= a
        out *= mult
        mult += np.uint64(82520 + inverse_i + inverse_i)
    assert i + 1 == num_items, "Fed in wrong num_items"
    out += np.uint64(97531)
    return out
```

FIG. 6

```
"ABC is a Python package that provides fast, flexible, and
expressive data structures....."
"""
def combine_hash_arrays(arrays: Iterator[np.ndarray],
num_items: int) -> np.ndarray:
"""

Parameters
----------
arrays : Iterator[np.ndarray]
num_items : int
Returns
-------
np.ndarray[uint64]
Should be the same as CPython's tupleobject.c
"""
try:
    first = next(arrays)
except StopIteration:
    return np.array([], dtype=np.uint64)
arrays = itertools.chain([first], arrays)
mult = np.uint64(1000003)
out = np.zeros_like(first) + np.uint64(0x345678)
for i, a in enumerate(arrays):
    inverse_i = num_items - i
    out ^= a
    out *= mult
    mult += np.uint64(82520 + inverse_i + inverse_i)
assert i + 1 == num_items, "Fed in wrong num_items"
out += np.uint64(97531)
return out
```

700

710

706A
706B
706A
706
706B

System 702
Language Model 704

708 hashing a content for ABC data frame

*FIG. 7*

CODE ENRICHMENT THROUGH METADATA FOR CODE SYNTHESIS

CROSS-REFERENCE TO RELATED APPLICATIONS/INCORPORATION BY REFERENCE

This application claims priority to U.S. Provisional Patent Application Ser. No. 63/261,602 filed on Sep. 24, 2021, titled, "Library Corpus for Large-Scale Language Models and Code Retrieval Models Using Augmented Code", the entire content of which is hereby incorporated herein by reference.

FIELD

The embodiments discussed in the present disclosure are related to code enrichment through metadata for code synthesis.

BACKGROUND

With advancements in machine learning, various types of language models have been developed for different machine-programming tasks, such as code synthesis or code retrieval. A language model is a statistical representation of probability distribution for a sequence of words where it aims to find relations between different words by processing a large corpora. Some language models aim to learn general-purpose representations that support downstream Natural Language-Programming language (NL-PL) applications such as code synthesis. Code synthesis corresponds to a task where a machine (such as a computer) aims to generate a source code for a given query as input. To perform code synthesis using a language model, the language model has to be trained initially. For training the language model, many state-of-the-art techniques disregard vast amount of non-code information present in the source code.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include acquiring package data associated with a software package from a data source. The package data may include source code files and package metadata associated with the software package. The operations may further include extracting additional metadata associated with the software package from the source code files and preparing metadata features based on the package metadata and the additional metadata. The operations may further include identifying a set of target portions of a source code included in the source code files and updating one or more source code files of the source code files by using the metadata features. The one or more source code files may be updated by performing at least one of a revision of existing code comments that may be associated with the set of target portions and an addition of new code comments for the set of target portions. The operations may further include generating a dataset of natural language (NL) text features and respective code features by using the updated one or more source code files. Thereafter, the operations may include training a language model on a sequence-to-sequence generation task based on the generated dataset.

The objective and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3A is a diagram that depicts an exemplary package data for code enrichment through metadata for code synthesis;

FIG. 3B is a diagram that depicts an exemplary additional metadata associated with the software package

FIG. 6 illustrates an exemplary scenario for updating one or more source code files for code enrichment through metadata for code synthesis;

FIG. 7 is a diagram that illustrates an exemplary scenario for training of a language model for code synthesis;

Figure 1:
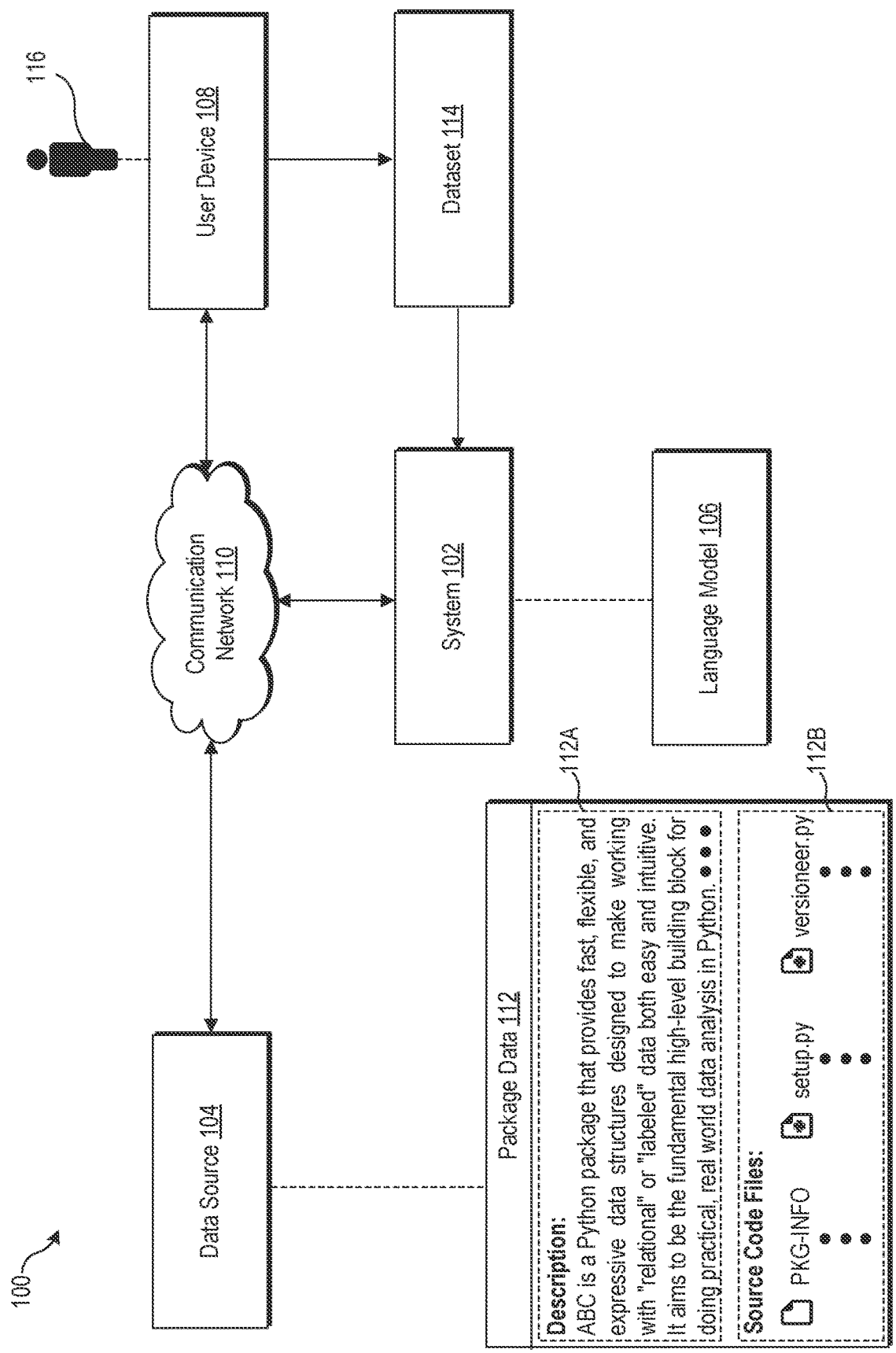
FIG. 1 is a diagram representing an exemplary environment related to code enrichment through metadata for code synthesis.

all according to at least one embodiment described in the present disclosure.

DESCRIPTION OF EMBODIMENTS

Machine learning has led to development of language models for various machine-programming tasks. A language model is a probabilistic model that provides a statistical representation of probability distribution for a sequence of words where it aims to find relation between different words by processing a large corpora. For instance, the language model may be able to predict the likelihood of word "Deliver" appears after "Leverages" as such "ABC Leverages World's Fastest Supercomputer 'XYZ' and AI to Deliver Real-Time Tsunami Prediction in Joint Project". Specifically, given sequence of length m, the language model may assign a probability $P(w_1, w_2, \ldots, w_m)$ to the whole sequence.

Language models are being used in a variety of sequence-to-sequence generation tasks such as a code synthesis task, a code retrieval task, or a software package analysis task. The code synthesis task corresponds to a task of generation of a source-code based on a natural language query. The code retrieval task corresponds to a task of retrieval of code snippets relevant to a given natural language query from a code base. The software package analysis task corresponds to a task of analysis of the software package for relevant information.

To perform the above-mentioned sequence-to-sequence generation tasks, the language models have to be trained on examples of datasets. For example, in case of code synthesis task, the language model has to be trained on a dataset that includes pairs of code snippets and natural language queries. Current state-of-art techniques for the training of the language models use only code snippet and natural language queries. The training using such dataset results in generation of language models that may be less generalized and may lack accuracy. For example, when the natural language queries are "Library A save a csv", and "Library B save a csv", the trained language model may not be able to differentiate between the above-mentioned natural language queries and may generate same code snippet for both the queries. This output may be irrelevant or undesirable. Therefore, there is a need to generate generalized language models trained on such sequence to sequence generation tasks.

The disclosure uses metadata associated with the code snippets in the training dataset. Specifically, the disclosed invention trains the language model with the code snippets and metadata features associated with the code snippets. Such metadata features may include software package information, installation requirements, metadata version information, license information, supported programming languages, entry points, descriptions, platform information, and the like. The usage of such metadata features may enhance and enrich the capabilities of the language models for the sequence-to-sequence generation task.

In contrast to the state-of-the-art solutions, the disclosed language model may be more generalized as compared to language models trained using state-of-the-art approaches. Also, the disclosed language model may be help software engineers to generate code with more details as compared to state-of-the-art methods. Based on experimental data, it has been observed that the performance of the language model trained based on metadata features, code, and natural language query may be better than the language models trained based on the state-of-the-art approaches.

Embodiments of the present disclosure are explained with reference to the accompanying drawings.

FIG. 1 is a diagram representing an exemplary environment related to code enrichment through metadata for code synthesis, arranged in accordance with at least one embodiment described in the present disclosure. With reference to FIG. 1, there is shown an example environment 100. In the example environment 100, there is shown a system 102 and a data source 104. There is further shown a language model 106, a user device 108, a communication network 110, package data 112, and a dataset 114. The system 102, the data source 104, and the user device 108 may be communicatively coupled to each other, via the communication network 110.

There is further shown a user 116 who may be associated with the user device 108. Examples of the user device 108 may include, but are not limited to, a mobile device, a desktop computer, a laptop, or a computer workstation. In one or more embodiments, the user device 108 may include a user-end terminal device and a server communicatively coupled to the user-end terminal device. Examples of the user-end terminal device may include, but are not limited to, a mobile device, a desktop computer, a laptop, or a computer workstation.

The data source 104 may include suitable logic, circuitry, and interfaces that may be configured to store the package data 112. The package data 112 may be associated with a software package and may include source code files 112A and package metadata 112B associated with the software package. In an embodiment, the source code files 112A may include a source code (i.e., a computer-executable code) and the package metadata 112B may include metadata about the software package in the form of a natural language text. In an embodiment, the source code files 112A may also include additional metadata about the software package. Examples of the data source 104 may include, but are not limited to, a web-based code hosting server, a database server, a file server, a web server, a Really Simple Syndication (RSS) feed, servers that host website(s) and web application(s) related to packages.

In an embodiment, the data source 104 may be implemented as multiple servers, which may include storage distributed across one or more availability zones (e.g., datacenters). In an embodiment, the data source may include a front-end system and a back-end system. The front-end system may be configured to provide an interface (such as a webpage or a client-side interface of a web-application) to view information associated with the package data 112. The back-end system may store databases, logic, and instructions to display content on the interface provided by the front-end system.

The language model 106 may be a probabilistic model that may be trained to generate probability distribution over sequences on an alphabet of tokens. The language model 106 may one of a statistical language model or a neural language model. The statistical language model may use statistical techniques to learn the probability distribution. These statistical techniques may include, for example, a unigram technique, a N-gram technique, a Hidden Markov Models (HMM), and other linguistic rules. Details of the implementation of the above-mentioned statistical techniques are known in the art. Therefore, a detailed description of the above-mentioned statistical techniques has been omitted for the sake of brevity.

The neural language model may use one or more neural networks to learn the probability distribution of words. In an embodiment, each of the one or more neural networks included in the neural language model may be a computational network or a system of artificial neurons, arranged in a plurality of layers, as nodes. The plurality of layers of the neural network may include an input layer, one or more hidden layers, and an output layer. Each layer of the plurality of layers may include one or more nodes (i.e., artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on the dataset 114.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different mathematical function.

In training of the neural network, one or more parameters of each node of the neural network may be updated, based on whether output of the final layer for a given input (from the dataset 114) matches a correct result based on a loss function for the neural network. The above process may be repeated for same or a different input till a minima of loss function is achieved, and a training error is minimized. Several methods for training are known in art, for example, gradient descent, stochastic gradient descent, batch gradient descent, gradient boost, meta-heuristics, and the like.

The neural language model may include electronic data, which may be implemented as, for example, a software component of an application executable on the system 102. The neural language model may rely on libraries, external scripts, or other logic/instructions for execution by a processing device, such as a processor. The neural language model may include code and routines configured to enable a computing device, such as the processor to perform one or more operations for generation of the lines of computer executable code for a natural language query as an input to the neural language model. Additionally, or alternatively, the neural language model may be implemented using hardware including a processor, a microprocessor (e.g., to perform or control performance of one or more operations), a field-programmable gate array (FPGA), or an application-specific integrated circuit (ASIC). Alternatively, in some embodiments, the neural language model may be implemented using a combination of hardware and software.

Examples of each of the one or more neural networks may include, but are not limited to, a deep neural network (DNN), a convolutional neural network (CNN), a recurrent neural network (RNN), a CNN-recurrent neural network (CNN-RNN), an artificial neural network (ANN), a Long Short Term Memory (LSTM) network based RNN, LSTM+ ANN, a gated recurrent unit (GRU)-based RNN, a fully connected neural network, a Connectionist Temporal Classification (CTC) based RNN, a deep Bayesian neural network, and/or a combination of such networks. In certain embodiments, each of the one or more neural networks may be based on a hybrid architecture of multiple Deep Neural Networks (DNNs).

In an embodiment, the language model 106 may correspond to a DNN that uses an encoder-decoder architecture. The DNN may be trained to generate one or more lines of computer-executable code for a natural language query as an input to the language. Specifically, such a language model may include an encoder neural network and a decoder neural network. Examples of such a DNN may include, but are not limited to, a Long Short-Term Memory (LSTM) network, a gated recurrent unit (GRU) network, a transformer model, or a variant of the transformer model, such as such as a Bidirectional Encoder Representations from Transformers (BERT) model or CodeBERT model.

In operation, the system 102 may be configured to acquire package data 112 associated with a software package from the data source 104. The package metadata may include the source code files 112A and the package metadata 112B. In an embodiment, the package metadata 112B may include at least one of a name of the software package, one or more classes used in the software package, a description of the software package, a summary of the software package, a programming language associated with the software package, an author of the software package, or a set of classifiers. Details about acquiring to the package data 112 are provided, for example, in FIG. 4.

Upon reception, the system 102 may be further configured to extract additional metadata associated with the software package from the source code files 112A. In an embodiment, the system 102 may be configured to parse the source code files 112A to extract the additional metadata associated with the software package. Content of the additional metadata may be different from the package metadata 112B. Details about the additional metadata are provided, for example, in FIG. 3B.

The system 102 may be further configured to prepare metadata features based on the package metadata 112B and the extracted additional metadata. In an embodiment, the preparation may include parsing the package metadata 112B and the additional metadata into metadata features. Each of the prepared metadata features may be represented in a key-value format and may include at least one of, but not limited to, software package information, installation requirement information, metadata version information, license information, supported programming languages, entry points, descriptions, or platform information. More details on the metadata features are provided, for example, in FIG. 4 and FIG. 5.

Based on the preparation of the metadata features, the system 102 may be configured to identify a set of target portions of source code included in the source code files 112A. The set of target portions may correspond to functions or classes that may be used in the source code. The identification may be performed to restrict a scope of update to the target portions in the source code files, as described herein.

The system 102 may be further configured to update one or more source code files of the source code files 112A by using the metadata features. Such files may be updated by performing at least one of a revision of existing code comments associated with the set of target portions and an addition of new code comments for the set of target portions. Examples of updating the one or more source code files are provided, for example, in FIG. 6.

The system 102 may be further configured to generate the dataset 114 of natural language (NL) text features and respective code features by using the updated one or more source code files. In an embodiment, the system 102 may be configures to control the user device 108 to display the generated dataset 114 on the user device 108. Based on the generated dataset 114, the system 102 may be further configured to train the language model 106. The language model 106 may be trained on a sequence-to-sequence generation task, such as but not limited to, a code synthesis task, a code retrieval task, or a software package analysis task. Details about the training of the language model 106 are provided, for example, in FIG. 7.

It should be noted that the communication between the system 102, the data source 104, the language model 106, and the user device 108 may be performed via the communication network 110. The communication network 110 may include a communication medium through which the system 102 may communicate with the data source 104, the language model 106, the user device 108, and/or different devices (not shown). Examples of the communication network 110 may include, but are not limited to, the Internet, a cloud network, a cellular network (such as a $4^{th}$ Generation Long-Term Evolution (LTE) or $5^{th}$ generation New Radio (NR)), a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the system 102 without departing from the scope of the present disclosure. For example, in some embodiments, the system 102 may include any number of other components that may not be explicitly illustrated or described.

Figure 2:
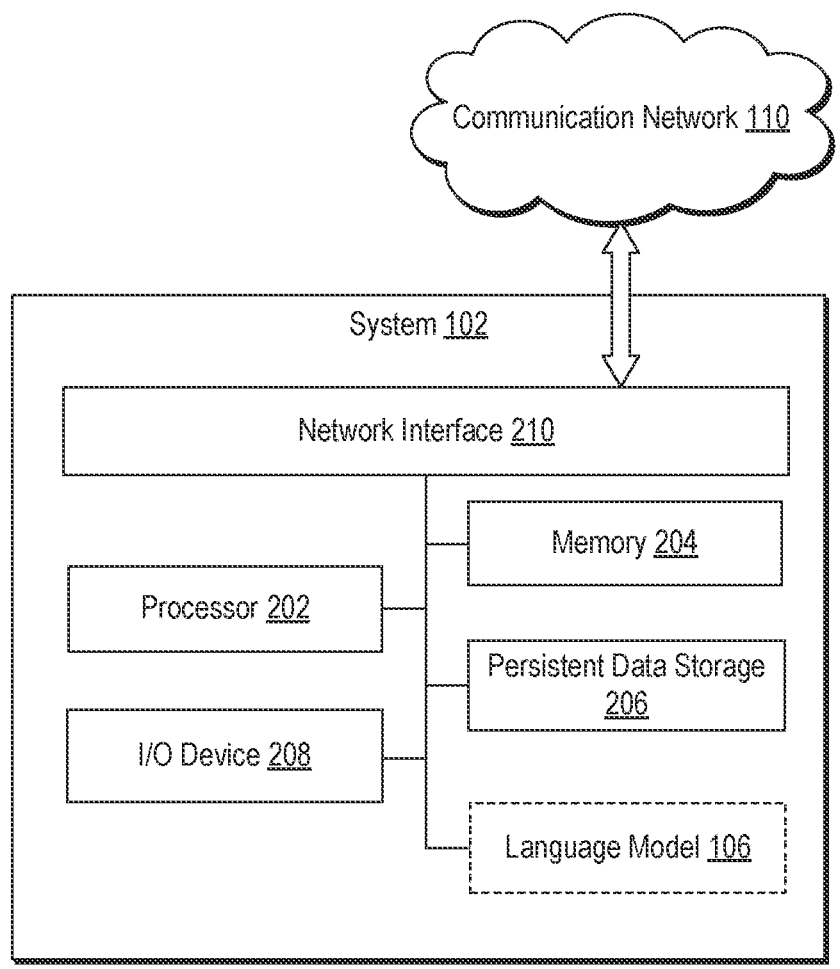
FIG. 2 is a block diagram of a system for code enrichment through metadata for code synthesis.

FIG. 2 is a block diagram of a system for code enrichment through metadata for code synthesis, arranged in accordance with at least one embodiment described in the present disclosure. FIG. 2 is explained in conjunction with elements from FIG. 1. With reference to FIG. 2, there is shown a block diagram 200 of the system 102 of FIG. 1. The block diagram 200 may further include a processor 202, a memory 204, a persistent data storage 206, an I/O block 208, a network interface 210, and the language model 106.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules, and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Central Processing Unit (CPU), a Reduced Instruction Set Computer (RISC) processor, an ASIC processor, a Complex Instruction Set Computer (CISC) processor, a Graphical Processing Unit (GPU), a co-processor, and/or a combination thereof.

The memory 204 may include suitable logic, circuitry, and/or interfaces that may be configured to store program instructions executable by the processor 202. In certain embodiments, the memory 204 may be configured to store the acquired package data 112, the extracted additional metadata, the prepared metadata features, the identified set of target portions, the updated one or more source code files, and the generated dataset 114. In certain embodiments, the memory 204 may be configured to store the language model 106. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive one or more user inputs. The I/O device 208 may be further configured to provide an output in response to the one or more user inputs. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display device and a speaker.

The network interface 210 may include suitable logic, circuitry, interfaces, and/or code that may be configured to establish a communication among the system 102, the data source 104, the language model 106, and the user device 108 via the communication network 110. The network interface 210 may be implemented by use of various known technologies to support wired or wireless communication of the system 102, via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

The functions or operations executed by the system 102, as described in FIG. 1, may be performed by the processor 202. Operations executed by the processor 202 are described in detail, for example, in FIG. 3A, FIG. 3B, FIG. 4, FIG. 5, FIG. 6, FIG. 7, and FIG. 8.

FIG. 3A is a diagram that depicts an exemplary package data for code enrichment through metadata for code synthesis, according to at least one embodiment described in the present disclosure. FIG. 3A is explained in conjunction with elements from FIG. 1 and FIG. 2. With reference to FIG. 3A, there is shown an electronic User Interface (UI) 300A. The electronic UI 300A may be displayed on the user device 108. Within the electronic UI 300A, there is further shown package data 302. The package data 302 may include source code files 304 and package metadata 306.

In an embodiment, the system 102 may be configured to acquire package data 302 from the data source 104. The package data 302 may be associated with a software package, such as an Open Source package in Python. The package data 302 may include source code files 304 and the package metadata 306. Each source code file may include a source code written in a programming language, such as but not limited to, Python, C, C++, C#, Swift, JavaScript, Go, Java®, or R. In accordance with an embodiment, the source code files 304 may include resource files associated with the software package. These resource files may include information about resources such as, but not limited to, definitions, configurations, setups, requirements, and distributions associated with the software package. In another embodiment, the source code files 304 may include folder and/or sub-folders that include additional source code files.

The package metadata 306 associated with the software package may include, for example, a name of the software package, one or more classes used in the software package, a description of the software package, a summary of the software package, a programming language associated with the software package, an author of the software package, a set of classifiers 308, and the like. The set of classifiers 308 may include, for example, a license associated with the software package, an operating system dependency associated with the software package, a topic associated with the software package, and the like.

As shown in FIG. 3A, for example, the source code files 304 for an 'ABC' package may include "_init_.py" file, "setup.py" file, "versioneer.py", "version.py", "PKG-INFO" file, and "config" folder. The "_init_.py" file, the "setup.py" file, and the "versioneer.py" or "version.py" file may include the version of source code of the software package and the "PKG-INFO" file may include information on resources associated with the software package. For example, the information in PKG-INFO file may include characteristics of the package along with information that helps control installation of the package. The "config" folder may include one or more sub-folders or additional source code files. Also, the package metadata 306 may indicate the name of the software package as "ABC", the description of the software package as "ABC is a Python package that provides fast, flexible, . . . ", the programming language associated with the software package as "Python", the license associated with the software package as "OSI Approved", the operating system dependency associated with the software package as "OS Independent", and the topic associated with the software package as "Science/Research".

FIG. 3B is a diagram that depicts additional metadata associated with the software package, according to at least one embodiment described in the present disclosure. FIG. 3B is explained in conjunction with elements from FIG. 1, FIG. 2, and FIG. 3A. With reference to FIG. 3B, there is shown an electronic User Interface (UI) 300B. The electronic UI 300B may be displayed on the user device 108. Within the electronic UI 300B, there is shown a path 310 of a first source code file (i.e., the PKG-INFO file) and additional metadata 312 included in the first source code file.

In an embodiment, the system 102 may be configured to extract the additional metadata 312 associated with the software package from the source code files 304. For the extraction, the system 102 may be configured to parse each of the source code files 304 associated with the source code package. Such additional metadata may include, for example, a metadata version associated with the software package, contact details of the author associated with the software package, one or more uniform resource locators (URLs) associated with the software package, a programming language requirement associated with the software package, a description content type associated with the software package, or background information associated with the software package. In one or more embodiments, the additional metadata 312 may include one or more components of the package metadata 306.

By way of example, the additional metadata 312 included in the first source code file "PKG-INFO" may be in a key-value format, and may include values of keys such as, but not limited to, "Metadata-Version", "Name", "Version", "Summary", "Home-page", "Author", "Author-email", "License", "Project-URL", "Project-URL", "Project-URL", "Platform", "Classifier: Development Status", "Classifier: Environment", "Classifier: Intended Audience", "Classifier: License", "Classifier: Operating System", "Classifier: Programming Language", "Classifier: Topic", "Requires-Python", "Description-Content-Type", "Provides-Extra", "Version", and "License-File".

Figure 4:
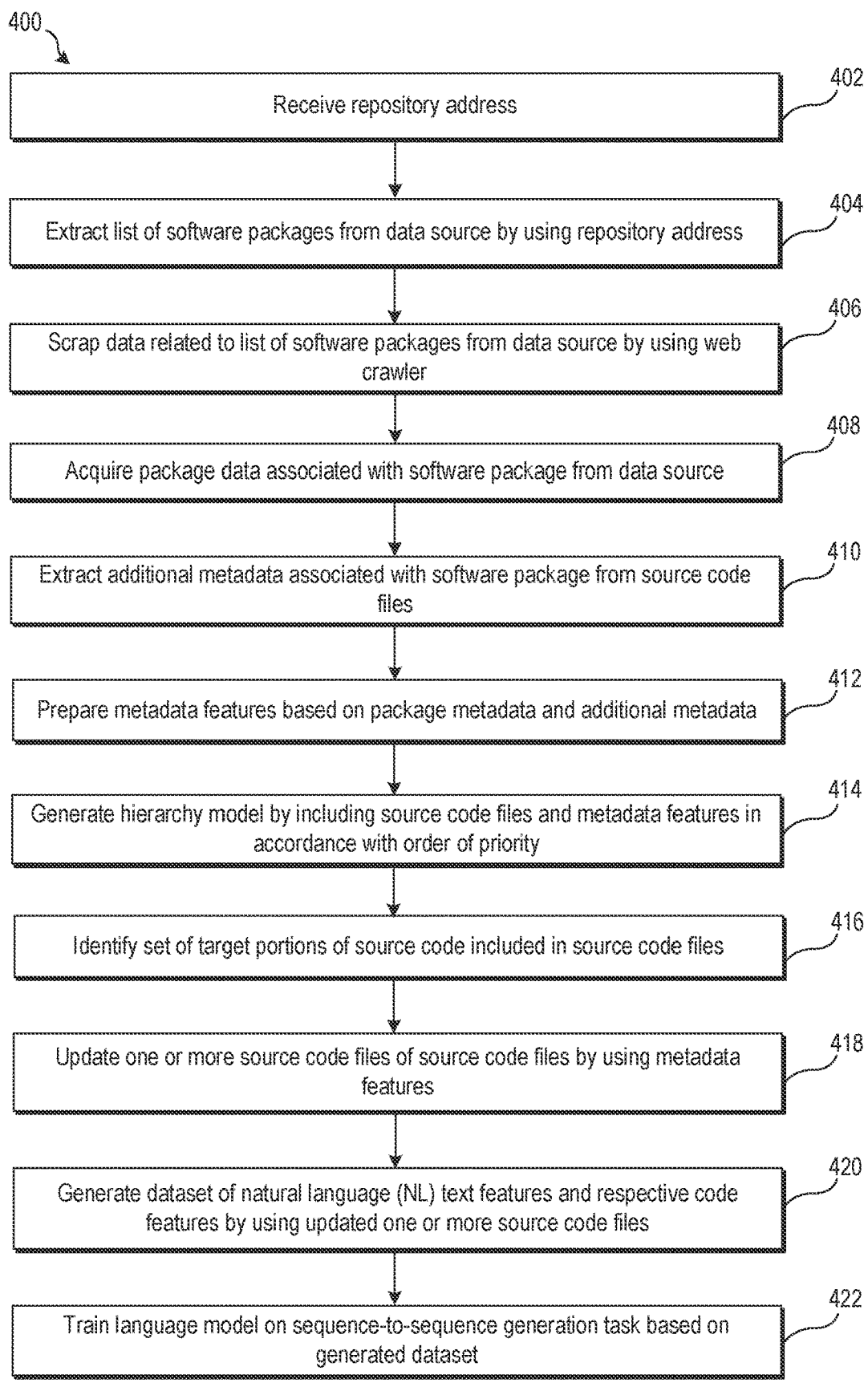
FIG. 4 illustrates a flowchart of an exemplary method for code enrichment through metadata for code synthesis.

FIG. 4 illustrates a flowchart of an exemplary method of code enrichment through metadata for code synthesis, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the system 102 of FIG. 1 or FIG. 2.

At 402, a repository address may be received. In an embodiment, the system 102 may be configured to receive the repository address from the user 116 via the user device 108. The repository address may be a URL associated a webpage of a repository that may be hosted on the data source 104. Examples of the repositories for Python programming language may include, but are not limited to, Anaconda® and PyPi®. The repositories for JavaScript programming language may include, for example, Npm®.

At 404, a list of software packages may be extracted. In an embodiment, the system 102 may be configured to extract the list of software packages based on the received repository address. The list of software packages may be extracted from the data source 104 and such packages may be associated with the repository linked to the repository address.

At 406, data related to the list of software packages may be scraped or extracted. In an embodiment, the system 102 may be configured to scrape data related to the extracted list of software packages from the data source. For scraping, the system 102 may use a web crawler or a web scraper to scrap the data related to the each of the extracted list of software packages. The scrapping of data may correspond to a process by which elements of a web-based resource are discovered and parsed to select the data that matches a defined set of rules for collection of the data.

At 408, the package data 302 may be acquired. In an embodiment, the system 102 may be configured to acquire package data associated with a software package of the list of software packages. The package data 302 may be acquired from the data source 104. Specifically, the package data 302 may be acquired from the data scraped from the data source using the repository address.

The package data 302 may include the source code files 304 and the package metadata 306 associated with the software package. In an embodiment, each of the source code files 304 may include the source code that may be executed to achieve an objective of the software package. In another embodiment, the source code files 304 may include resource files associated with the software package. These resource files may include information about resources such as, but not limited to, definitions, configurations, setups, requirements, and distributions associated with the software package. The package metadata 306 associated with the software package may include at least one of, but not limited to, a name of the software package, one or more classes used in the software package, a description of the software package, a summary of the software package, a programming language associated with the software package, an author of the software package, or a set of classifiers. An example page of the package data 302 is provided, for example, in FIG.

At 410, additional metadata may be extracted. In an embodiment, the system 102 may be configured to extract additional metadata associated with the software package from the source code files 304. Details about the additional metadata and the extraction of the additional metadata are provided, for example, in FIG. 3B.

At 412, metadata feature may be prepared. In an embodiment, the system 102 may be configured to prepare the metadata features. The metadata features may be prepared based on the package metadata 306 and the additional metadata. In an embodiment, the preparation of the metadata features may include parsing the package metadata 306 and the additional metadata into the metadata features. Each of the prepared metadata features may be represented in a key-value (i.e., key: value) format. In an embodiment, the prepared metadata features may include at least one of software package information, installation requirement information, metadata version information, license information, supported programming languages information, entry point information, description information, or platform information. The software package information may be associated with the software package and may include information related to, but not limited to, a name of the software package, a URL associated with the software package, an alias name of the software package, or a version of the software package. The installation requirement information may include information related to one or more software or hardware resources that may be required for a computer to install and/or execute a source code associated with the software package. The metadata version information may include information associated with a version of the package metadata 306. The license information may include information associated with a type of license associated with the software package. The supported programming languages information may include information associated with one or more programming languages that may have been used in preparation of the source code of the software package. The keywords information may include information associated with one or more keywords used in the preparation of the source code of the software package. The entry point information may include information associated with one or more entry points within the source code of the software package. The description information may include information related to, but is not limited to, a summary of the software package, a project description of the software package, and a short description of the software package. The platform information may include information related to, but is not limited to, a platform (or operating system) required for the execution of the source code associated with the software package.

As a first example, if the name of software package is "ABC", then the corresponding metadata feature may be represented as ("package_name","ABC"). As another example, if the metadata version associated with the software package "ABC" is "1.0", the corresponding metadata feature may be represented as ("metadata_version","1.0").

At 414, a hierarchy model may be generated. The hierarchy model may be generated by including the source code files and the metadata features. The source code files, and the metadata features may be included in accordance with an order of priority. In an embodiment, the order of priority may be pre-defined or preset based on rules and criteria. Details about the hierarchy model and the generation of the hierarchy model are provided, for example, in FIG. 5.

At 416, a set of target portions the source code included in the source code files 304 may be identified. Each of the set of target portions of the source code may be identified from the source code files using the hierarchy model. In an embodiment, the set of target portions may correspond to functions or classes that may be used in the source code. Details about the identification of the set of target portions are provided, for example, in FIG. 6.

At 418, one or more source code files of the source code files may be updated. In an embodiment, the system 102 may be configured to update one or more source code files of the source code files by using the metadata features. As discussed, the metadata features may be represented as key-value pairs. The system 102 may be configured to update the one or more source code files by performing at least one of a revision of existing code comments that may be associated with the set of target portions and an addition of new code comments for the set of target portions.

In an embodiment, the system 102 may be configured to search for keys of the metadata features in the one or more source code files. The search may be performed within a content of the set of target portions. Specifically, the search may be performed in the content that may be within a scope of the set of target portions.

Based on the search, the system 102 may be configured to determine pieces of the content that includes keywords matching at least a subset of the keys of the metadata features. The determined pieces of content may correspond to the existing code comments. The system 102 may be configured to replace the keywords in the existing code comments with values corresponding to the subset of the keys in the metadata features. This replacement of the keywords in the existing code comments with values corresponding to a subset of the keys in the metadata features may correspond to the revision of the existing code comments.

In accordance with an embodiment, the system 102 may be configured to update the one or more source code files by addition of new code comments for the set of target portions. Each of the new code comments may include a key of the subset of the keys and a value corresponding to the key in the metadata features. Each of the new code comments may be included in a proximity of a respective target portion of the set of target portions of the source code. With reference to the FIG. 3A and the first example, at least one of the source code files may be updated by addition of a new comment "ABC is a Python package that provides fast, flexible, and expressive data structures designed to make working with "relational" or "labeled" data both easy and intuitive. It aims to be the fundamental high-level building block for doing practical, real world data analysis in Python. Additionally, it has the broader goal of becoming the most powerful and flexible open source data analysis/manipulation tool available in any language. It is already well on its way towards this goal." Details related to update of the one or more source code files are provided, for example, in FIG. 6.

At 420, a dataset of natural language (NL) text features and respective code features may be generated. In an embodiment, the system 102 may be configured to generate the dataset of the NL text features and the code features. The dataset may be generated by using the updated one or more source code files. Details about the generation of the dataset are provided in FIG. 7, for example.

At 422, the language model 106 may be trained on the sequence-to-sequence generation task based on the generated dataset. The sequence-to-sequence generation task may be one a code synthesis task, a code retrieval task, or a software package analysis task. The language model may be trained to generate lines of computer executable code for a natural language query as an input to the language model 106. In an embodiment, the language model may be implemented using Deep Neural Network(s) that use an encoder-decoder architecture. If a pre-trained language model exists, then the system 102 may fine-tune the pre-trained language model based on the generated dataset. In fine-tuning, examples of the dataset 114 may be used to update parameters such as weights of the pre-trained language model. Details about training the language model 106 are provided, for example, in FIG. 7.

Control may pass to end. Although the flowchart 400 is illustrated as discrete operations, such as 402, 404, 406, 408, 410, 412, 414, 416, 418, 420, and 422. However, in certain embodiments, such discrete operations may be further divided into additional operations, combined into fewer operations, or eliminated, depending on the particular implementation without detracting from the essence of the disclosed embodiments.

Figure 5:
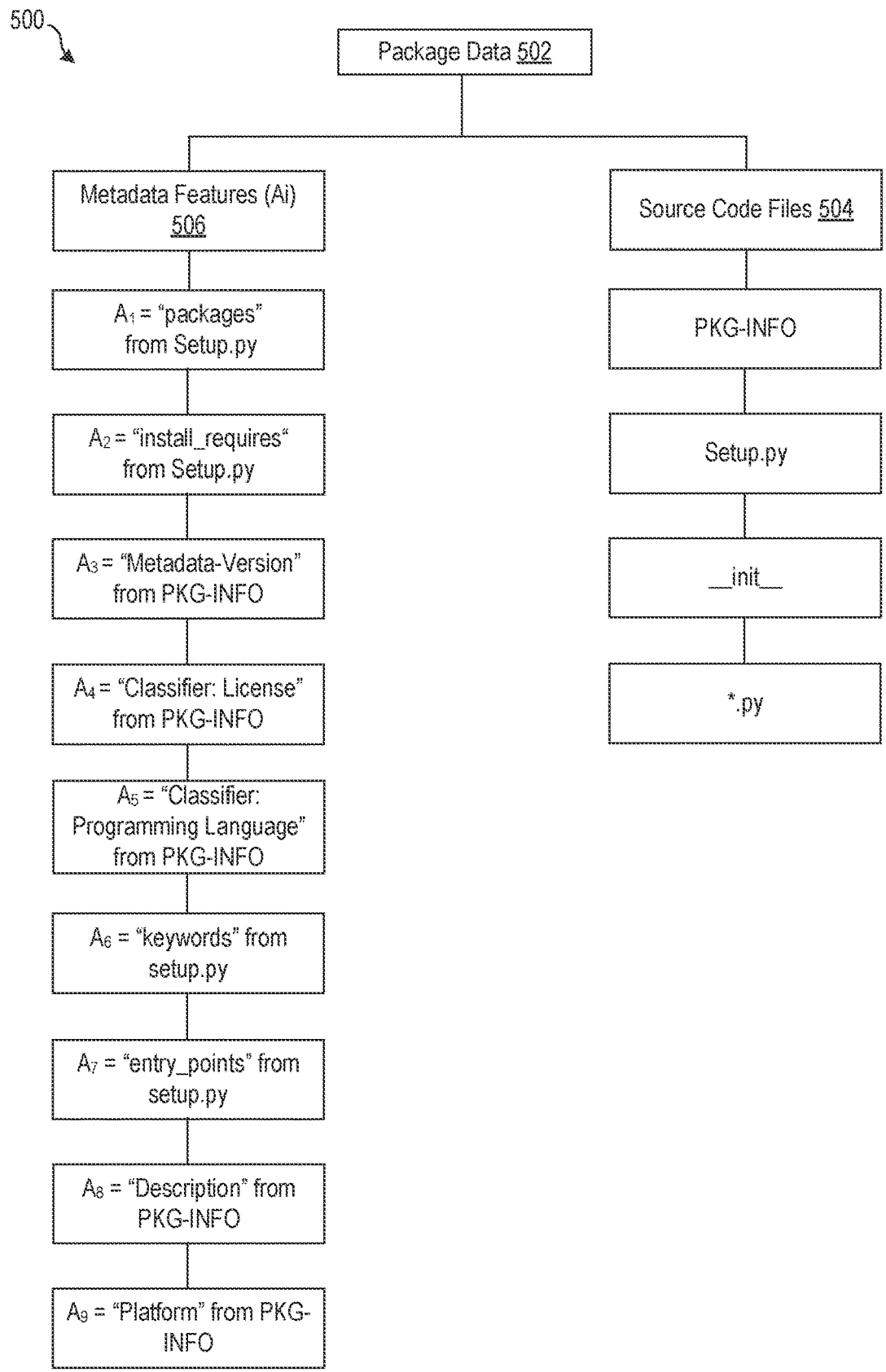
FIG. 5 illustrates an exemplary hierarchy model for code enrichment through metadata for code synthesis.

FIG. 5 illustrates an exemplary hierarchy model for code enrichment through metadata for code synthesis, according to at least one embodiment described in the present disclosure. FIG. 5 is explained in conjunction with elements from FIG. 1, FIG. 2, FIG. 3A, FIG. 3B, and FIG. 4. With reference to FIG. 5, there is shown a hierarchy model 500. There is further shown package data 502, source code files 504, and metadata features 506.

In an embodiment, the system 102 may be configured to acquire package data 502 associated with a software package from a data source. The package data 502 may include the source code files 504 and package metadata associated with the software package. By way of example, and not limitation, the source code files 504 may include, a "PKG-INFO" file, a "Setup.py" file, an "_init_" file, and a "*.py" file. In an embodiment, the asterisk in "*.py" may indicate that all the files with a ".py" extension may be considered as part of in the source code files.

The system 102 may be further configured to extract the additional metadata associated with the software package from the source code files 504. Based on the package metadata and the extracted additional metadata, the system 102 may be configured to prepare metadata features ($A_i$) 506. The system 102 may be further configured to generate the hierarchy model 500. The hierarchy model 500 may include the source code files 504 and the metadata features 506. The source code files 504 and the metadata features 506 may be arranged in an order of priority. In an embodiment, the order of priority may be pre-decided or preset based on rules and criteria. For example, the "PKG-INFO" file may have highest priority and therefore may be placed at the top in the hierarchy model 500. The "Setup.py" may have a second highest priority after the "PKG-INFO" file and therefore may be placed below the "PKG-INFO" file in the section associated with the source code files 504 in the hierarchy model 500. From the metadata features 506, a metadata feature with key "packages" and the corresponding value from the "Setup.py" file may have the highest priority among the metadata features and therefore, such a metadata feature may be placed in the top of the hierarchy model 500. As another example, the metadata feature with key "install_requires" and the corresponding value from the "Setup.py" file may have the second highest priority within the metadata features 506. Therefore, such a feature may be placed right below the metadata feature with key "packages".

In an embodiment, the metadata features 506 may be represented by $A_i$ and may include, for example, a first metadata feature ($A_1$), a second metadata feature ($A_2$), a third metadata feature ($A_3$), a fourth metadata feature($A_4$), a fifth metadata feature ($A_5$), a sixth metadata feature ($A_6$), a seventh metadata feature ($A_7$), an eight metadata feature ($A_8$), and a ninth metadata feature ($A_9$. Mathematically, the metadata features may be represented by equation (1) as follows:

$$A_i=[A_1,A_2,A_3,A_4,A_5,A_6,A_7,A_8,A_9] \quad (1)$$

In an embodiment, the metadata features 506 may include at least one of software package information, installation requirement information, metadata version information, license information, supported programming languages information, entry point information, description information, or platform information. Specifically, the first metadata feature ($A_i$) may include software package information, the second metadata feature ($A_2$) may include the installation requirement information, the third metadata feature ($A_3$) may include the metadata version information, the fourth metadata feature ($A_4$) may include the license information, the fifth metadata feature ($A_5$) may include the supported programming languages information, the sixth metadata feature ($A_6$) may include the keywords information, the seventh metadata feature ($A_7$) may include the entry point information, the eighth metadata feature ($A_8$) may include the description information, and the ninth metadata feature ($A_9$) may the platform information.

In an embodiment, the software package information associated with the first metadata feature ($A_1$) may be extracted from "Setup.py" file, the installation requirement information associated with the second metadata feature ($A_2$) may be extracted from "Setup.py" file, the metadata version information associated with the third metadata feature ($A_3$) may be extracted from "PKG-INFO" file, the license information associated with the fourth metadata feature ($A_4$) may be extracted from "PKG-INFO" file, the supported programming languages information associated with the second metadata feature ($A_5$) may be extracted from "PKG-INFO" file, the keywords associated with the sixth metadata feature ($A_6$) may be extracted from "Setup.py" file, the entry point information associated with the seventh metadata feature ($A_7$) may be extracted from "Setup.py" file, the description associated with the eighth metadata feature ($A_8$) may be extracted from "PKG-INFO" file, and the platform information associated with the ninth metadata feature ($A_9$) may be extracted from "PKG-INFO" file.

The system 102 may be further configured to identify a set of target portions of the source code included in the source code files 504 by using the generated hierarchy model 500. The set of target portions may correspond functions or classes that may be used in the source code. The identified set of target portions may have to be updated using the metadata features 506. Details about updating the set of target portions are provided, for example, in FIG. 6.

In an embodiment, the system 102 may be configured to generate an index list based on identified set of target portions. Specifically, the system 102 may be configured to generate the index list of one or more classes in the identified set of target portions, based on a presence of one or more functions (or methods) associated with the one or more classes in the identified set of target portions.

By using the index list, the system 102 may be configured to search for keys of the metadata features 506 in the one or more source code files. Specifically, the search may be performed within a content of the set of target portions. In an embodiment, the content of the set of target portions may include comments or docstrings (written in the one or more source code files) associated with the corresponding set of target portions. An example of the content of target portions that include comments or docstrings is provided, for example, in FIG. 6. The system 102 may be configured to determine pieces of the content that include keywords matching at least a subset of the keys of the metadata features 506. In an embodiment, the determined pieces of the content may correspond to existing code comments. As an example, a piece of the content that corresponds to existing code comments may be given as follows:

"Parameters arrays:Iterator[np.ndarray] num_items:int
Returns np.ndarray[uint64]Should be the same as CPython's tupleobject.c"

The system 102 may be configured to update one or more source code files of the source code files 504 by using the metadata features 506. The one or more source code files may be updated by performing a revision of the existing code comments associated with the set of target portions. The revision of the existing code comments may be performed by replacing the keywords in the existing code comments with values corresponding to the subset of the keys in the metadata features 506.

In another embodiment, the system 102 may be configured to update one or more source code files of the source code files 504 by using the metadata features 506 and by performing addition of new code comments for the set of target portions. Each of the new code comments may include a key of the subset of the keys and a value corresponding to the key in the metadata features 506. In an embodiment, each of the new code comments may be included in a proximity of a respective target portion of the set of target portions of the source code. For example, the new comment may be included immediately before or immediately after the source code of the respective target portion. Details about the addition of the new comment are provided, for example, in FIG. 6.

FIG. 6 illustrates an exemplary scenario for updating one or more source code files for code enrichment through metadata for code synthesis, according to at least one embodiment described in the present disclosure. FIG. 6 is explained in conjunction with elements from FIG. 1, FIG. 2, FIG. 3A, FIG. 3B, FIG. 4, and FIG. 5. With reference to FIG. 6, there is shown a scenario 600. There is further shown a system 602, a first source code file 604, and an updated first source code file 606. The system 602 may be an exemplary implementation of the system 102 of FIG. 1 or FIG. 2.

In an embodiment, the system 602 may be configured to acquire the package data 302 associated with a software package from the data source 104. The package data 302 may include the source code files 304 and the package metadata 306 associated with the software package. The source code files 304 may include the first source code file 604. In an embodiment, the first source code file 604 may include a first source code 604A. The system 602 may be further configured to extract additional metadata 312 that may be associated with the software package from the source code files 304. The system 602 may be further configured to prepare metadata features based on the package metadata 306 and the additional metadata. The system 602 may be further configured to identify a set of target portions of a source code included in the source code files 304. The set of target portions may correspond to functions or classes that may be used in the first source code 604A.

Based on the identification of the set of target portions, the system 102 may be further configured to update the first source code file 604 by using the metadata features to generate the updated first source code file 606. The first source code file 604 may be updated by an addition of a new code comment 608 for the set of target portions. The new code comment 608 may include a key of the subset of the keys and a value corresponding to the key in the metadata features as explained in 500. For example, if the metadata feature is ("package_name","ABC"), then the new code comment 608 may be "ABC is a Python package that provides fast, flexible, and expressive data structures . . . .".

As another example, if the package metadata associated with a software package includes "Read a table of fixed-width formatted lines into DataFrame.", then the source code files associated with the corresponding software package may include the following:

"z = ZipFile(io.BytesIO( content), 'r')
sg = z.read('19SG_DESC.txt').decode('latin-1')
dx = z.read('19DX_DESC.txt').decode('latin-1')
sg = pd. read_fwf (
  io. Stringto(sg),
  widths=[5, 200),
  names=['icd_prcdr_cd', 'desc'],
  dtype={'icd_prcdr_cd': 'str'})
dx = pd. read_fwf(
  io. StringIo(dx), -continued

```
    widths=[5, 200),
    names=['icd_dgns_cd', 'desc'],
    dtype={'icd_dgns_cd': 'str'})"
```

The system 602 may be configured to update the above-mentioned source code based on the metadata features that may be prepared from the package metadata. Specifically, the system 102 may prepare the metadata features which may include the name of the function i.e. "pd. read_fwf" and identify the set of target portions which may include the function "pd. read_fwf". The system 602 may add new comment in a proximity (e.g., immediately before starting) of a respective target portion to update the code. The updated code may be given as follows:

```
"z = ZipFile(io.BytesIO( content), 'r')
sg = z.read('19SG_DESC.txt').decode('latin-1')
dx = z.read('19DX_DESC.txt').decode('latin-1')
# Read a table of fixed-width formatted lines into DataFrame.
sg = pd. read_fwf (
    io. Stringto(sg),
    widths=[5, 200),
    names=['icd_prcdr_cd', 'desc'],
    dtype={'icd_prcdr_cd': 'str'})
# Read a table of fixed-width formatted lines into DataFrame.
dx = pd. read_fwf(
    io. StringIo(dx),
    widths=[5, 200),
    names=['icd_dgns_cd', 'desc'],
    dtype={'icd_dgns_cd': 'str'})"
```

FIG. 7 is a diagram that illustrates an exemplary scenario for training of a language model for code synthesis, in accordance with example embodiments. FIG. 7 is explained in conjunction with elements from FIG. 1, FIG. 2, FIG. 3A, FIG. 3B, FIG. 4, FIG. 5, and FIG. 6. With reference to FIG. 7, there is shown an exemplary scenario 700. In FIG. 7, there is shown a system 702 that may include a language model 704. The system 702 may be an exemplary implementation of the system 102 of FIG. 1 or FIG. 2. There is further shown a first training sample 706 of a plurality of training samples included in the dataset, an input 708, and an output 710.

In an embodiment, the system 102 may operate in two phases—a setup phase and a prediction phase. The system 102 may operate in the prediction phase after one or more operations of the setup phase has been executed.

In the setup phase, the system 702 may be configured to train the language model 704 on a sequence-to-sequence generation task. To train the language model 704, the system 702 may be configured to generate the dataset of NL text features and respective code features as training data by using the updated one or more source code files. The dataset may include the plurality of training samples. Each training sample of the plurality of training samples in the dataset may include an NL text feature and a respective code feature. For example, the first training sample 706 of the plurality of training samples may include first NL text features 706A and first code features 706B.

The language model 704 may be trained on a sequence-to-sequence generation task based on the generated dataset. The sequence-to-sequence generation task may be one of a code synthesis task, a code retrieval task, or a software package analysis task. In an embodiment, the language model 704 may be a deep neural network that may use an encoder-decoder architecture. In an embodiment, the language model 704 may be trained to generate the lines of computer executable code for a natural language query as an input to the language model 704.

In an embodiment, the system 702 may be configured to extract an NL text feature and a respective code feature from the dataset. The system 702 may be further configured to generate embeddings of the extracted NL text feature and the respective code feature for training of the language model 704 on the sequence-to-sequence generation task using the generated embedding. In an embodiment, the system 702 may generate a plurality of tokens from the text features and the respective code features, based on the generated plurality of tokens. The embedding of the extracted NL text feature and the respective code feature may correspond to a concatenated vector representation of the extracted NL text feature and the respective code feature.

In the prediction phase, the system 702 may be configured to receive the input 708. The input 708 may be received from the user 116 via the user device 108 and may include the natural language query. By way of example, and not limitation, the natural language query may include a text, such as "hashing a content for ABC data frame". Upon reception, the system 702 may be configured to apply the trained language model 704 on the received input 708 and generate the output 710 based on the application of the language model 704 on the received input 708. The generated output may include lines of computer executable code associated with the natural language query, as shown in FIG. 7, for example.

In an embodiment, the system 702 may be configured to fine-tune a pre-trained language model. The fine-tuning of the pre-trained language model may correspond to adjusting the pre-trained language model to achieve desired output or performance. The system 702 may fine-tune the pre-trained language model using the generated dataset. Specifically, the system 702 may update parameters such as weights of the pre-trained language model using the generated dataset.

In an embodiment, the received input 708 may correspond to a license associated with package data, or a category of computer-executable code (such as Web-development, Application—development, mobile application development. As an example, if the received input 708 corresponds to the category of computer-executable code, then the generated output 710 may include all the codes associated with the corresponding category.

It should be noted that the enrichment of the one or more source code files with the metadata features and then training the language model may improve the performance of the language model in downstream tasks such as code synthesis or code retrieval. In case the source code files lack user comments, the disclosure provides a method to automatically add new comments from the metadata associated with the corresponding package.

Various embodiments of the disclosure may provide one or more non-transitory computer-readable storage medium configured to store instructions that, in response to being executed, cause a system (such as the system 102) to perform operations. The operations may include acquiring package data associated with a software package from a data source. The package data may include source code files and package metadata associated with the software package. The operations may further include extracting additional metadata associated with the software package from the source code files. The operations may further include preparing metadata features based on the package metadata and the additional metadata. The operations may further include identifying a set of target portions of a source code included in the source code files. The operations may further include updating one or more source code files of the source code files by using the metadata features. The one or more source code files may be updated by performing at least one of a revision of existing code comments that are associated with the set of target portions, and an addition of new code comments for the set of target portions. The operations may further include generating a dataset of natural language (NL) text features and respective code features by using the updated one or more source code files. The operations may further include training a language model on a sequence-to-sequence generation task based on the generated dataset.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, executed by a processor, comprising:
    acquiring package data associated with a software package from a data source, the package data comprising source code files and package metadata associated with the software package;
    extracting additional metadata associated with the software package from the source code files;
    preparing metadata features based on the package metadata and the additional metadata;
    identifying a set of target portions of a source code included in the source code files based on the preparation of the metadata features, wherein the preparation comprises parsing the package metadata and the additional metadata in the metadata features, each of which is represented in a key-value format;

updating one or more source code files of the source code files by using the prepared metadata features, wherein the one or more source code files are updated by performing at least one of:
- a revision of existing code comments that are associated with the set of target portions, and
- an addition of new code comments for the set of target portions;

generating a dataset of natural language (NL) text features and respective code features by using the updated one or more source code files; and training a language model on a sequence-to-sequence generation task based on the generated dataset.

2. The method according to claim 1, further comprising:
extracting a list of software packages from the data source by using a repository address; and
scraping data related to the list of software packages from the data source by using a web crawler, wherein the package data associated with the software package is acquired from the scraped data.

3. The method according to claim 1, wherein the package metadata associated with the software package comprises at least one of a name of the software package, one or more classes used in the software package, a description of the software package, a summary of the software package, a programming language associated with the software package, an author of the software package, or a set of classifiers.

4. The method according to claim 1, wherein the metadata features comprise at least one of software package information, installation requirement information, metadata version information, license information, supported programming languages information, keywords information, entry points information, description information, or platform information.

5. The method according to claim 1, further comprising generating a hierarchy model by including the source code files and the metadata features in accordance with an order of priority.

6. The method according to claim 5, wherein each of the set of the target portions of the source code is identified from the source code files using the hierarchy model.

7. The method according to claim 1, wherein the set of target portions correspond to functions or classes used in the source code.

8. The method according to claim 1, further comprising:
searching for keys of the metadata features in the one or more source code files, wherein the search is performed within a content of the set of target portions; and
determining, based on the search, pieces of the content that include keywords matching at least a subset of the keys of the metadata features, wherein the determined pieces of the content correspond to the existing code comments.

9. The method according to claim 8, wherein the revision of the existing code comments is performed by replacing the keywords in the existing code comments with values corresponding to the subset of the keys in the metadata features.

10. The method according to claim 8, wherein each of the new code comments includes a key of the subset of the keys and a value corresponding to the key in the metadata features, and wherein each of the new code comments is included in a proximity of a respective target portion of the set of target portions of the source code.

11. The method according to claim 1, further comprising:
extracting an NL text feature and a respective code feature from the dataset; and
generating embeddings of the extracted NL text feature and the respective code feature, wherein the language model is trained on the sequence-to-sequence generation task using the generated embedding.

12. The method according to claim 1, wherein the sequence-to-sequence generation task is a code synthesis task, a code retrieval task, or a software package analysis task.

13. The method according to claim 1, further comprising:
receiving an input associated with data of an unseen software package; and
generating lines of computer executable code based on application of the trained language model on the received input.

14. A non-transitory computer-readable storage medium configured to store instructions that, in response to being executed, causes a system to perform operations, the operations comprising:
acquiring package data associated with a software package from a data source, the package data comprising source code files and package metadata associated with the software package;
extracting additional metadata associated with the software package from the source code files;
preparing metadata features based on the package metadata and the additional metadata;
identifying a set of target portions of a source code included in the source code files based on the preparation of the metadata features, wherein the preparation comprises parsing the package metadata and the additional metadata in the metadata features, each of which is represented in a key-value format;
updating one or more source code files of the source code files by using the prepared metadata features, wherein the one or more source code files are updated by performing at least one of:
- a revision of existing code comments that are associated with the set of target portions, and
- an addition of new code comments for the set of target portions;

generating a dataset of natural language (NL) text features and respective code features by using the updated one or more source code files; and training a language model on a sequence-to-sequence generation task based on the generated dataset.

15. The non-transitory computer-readable storage medium according to claim 14, wherein the operations further comprise:
extracting a list of software packages from the data source by using a repository address; and
scraping data related to the list of software packages from the data source by using a web crawler, wherein the package data associated with the software package is acquired from the scraped data.

16. The non-transitory computer-readable storage medium according to claim 14, wherein the metadata features comprise at least one of software package information, installation requirement information, metadata version information, license information, supported programming languages information, keywords information, entry points information, description information, or platform information.

17. The non-transitory computer-readable storage medium according to claim 14, wherein the operations further comprise generating a hierarchy model by including the source code files and the metadata features in accordance with an order of importance.

18. The non-transitory computer-readable storage medium according to claim 17, wherein each of the set of the target portions of the source code is identified from the source code files using the hierarchy model.

19. A system, comprising:
   a processor configured to:
      acquire package data associated with a software package from a data source, the package data comprising source code files and package metadata associated with the software package;
      extract additional metadata associated with the software package from the source code files;
      prepare metadata features based on the package metadata and the additional metadata;
      identify a set of target portions of a source code included in the source code files based on the preparation of the metadata features, wherein the preparation comprises parsing the package metadata and the additional metadata in the metadata features, each of which is represented in a key-value format;
      update one or more source code files of the source code files by using the prepared metadata features, wherein the one or more source code files are updated by performing at least one of:
         a revision of existing code comments that are associated with the set of target portions, and
         an addition of new code comments for the set of target portions;
      generate a dataset of natural language (NL) text features and respective code features by using the updated one or more source code files; and
      train a language model on a sequence-to-sequence generation task based on the generated dataset.

* * * * *